Figure 7:
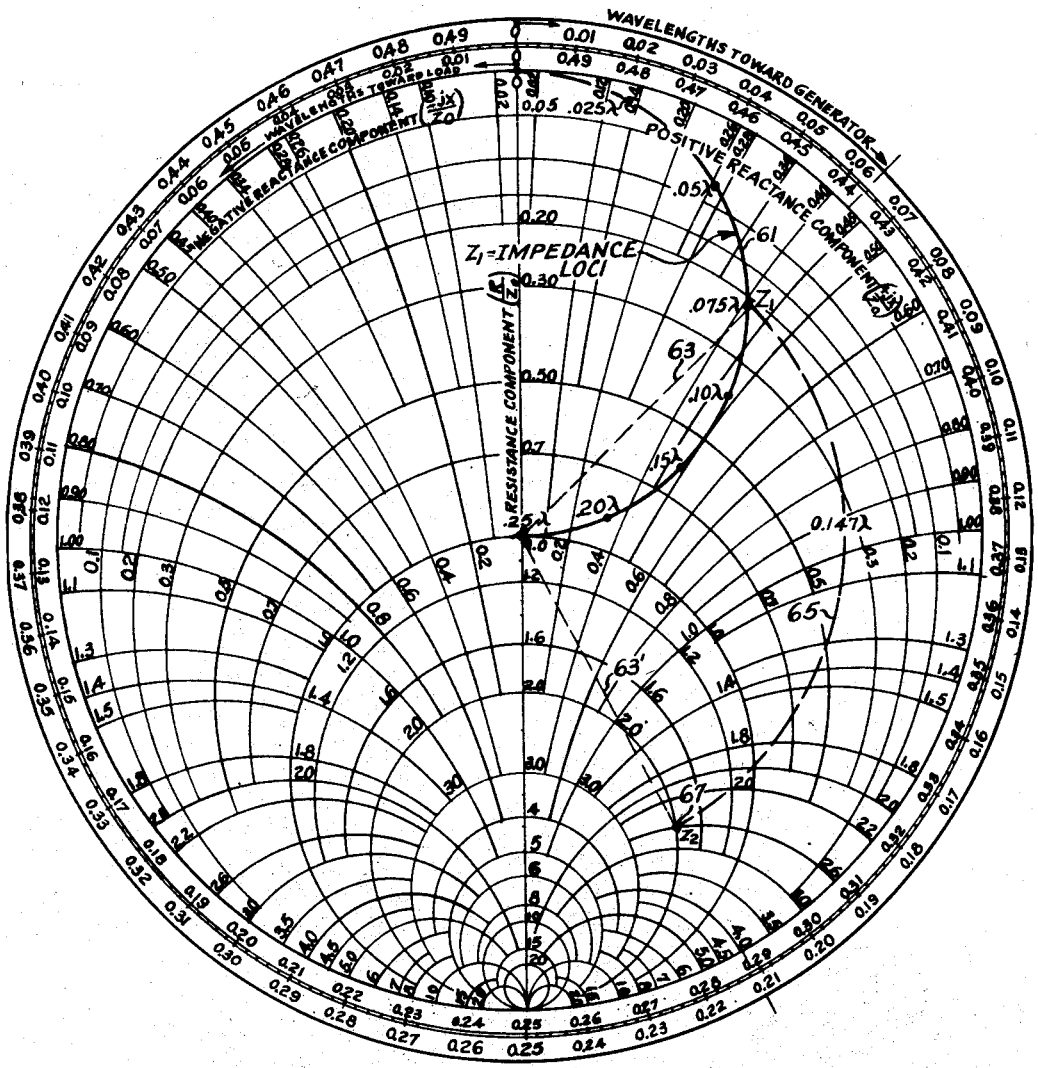

March 3, 1953  O. M. WOODWARD, JR  2,630,475
MEANS FOR MEASURING IMPEDANCE AT RADIO FREQUENCIES
Filed Aug. 29, 1947  3 Sheets-Sheet 1
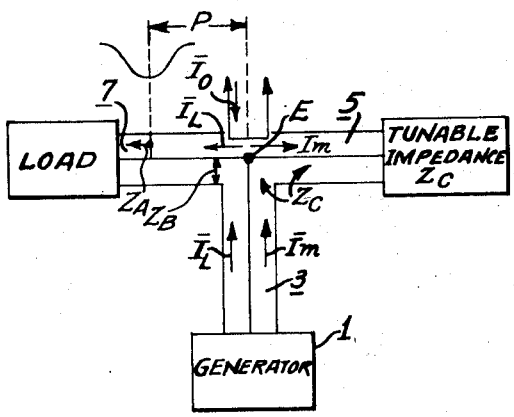
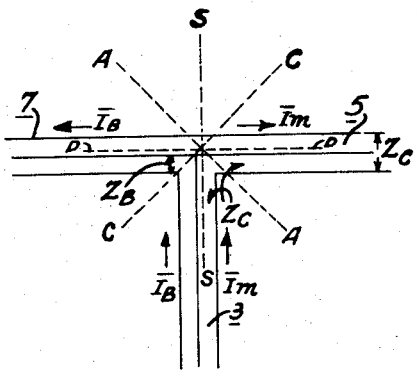
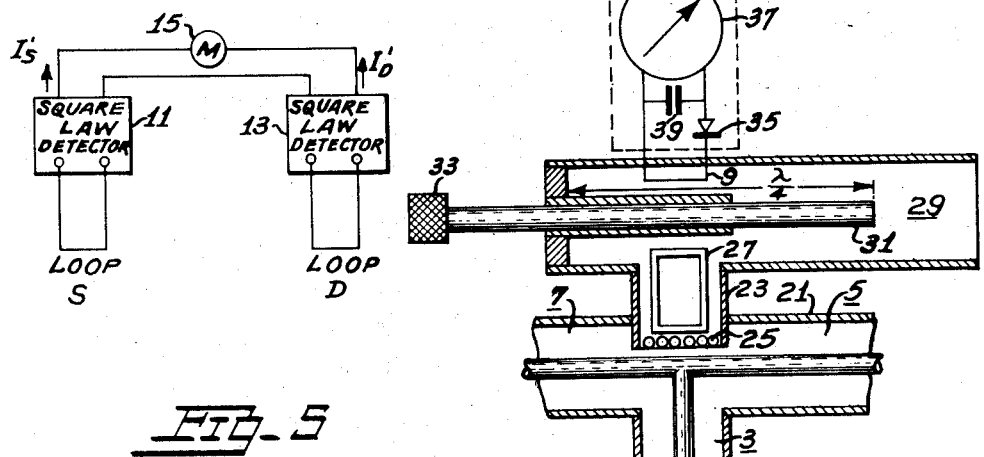
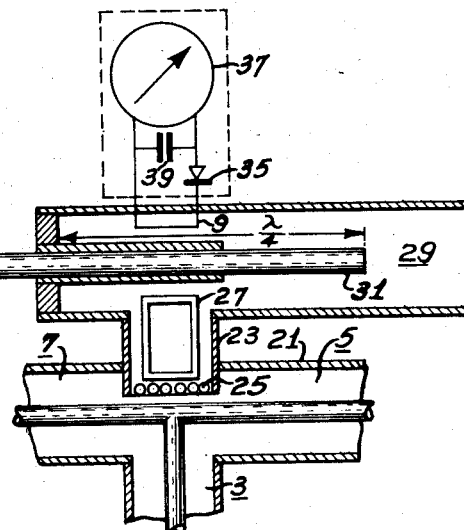
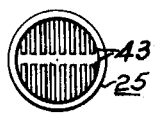
Inventor
OAKLEY M. WOODWARD, JR.
Attorney March 3, 1953 O. M. WOODWARD, JR 2,630,475
MEANS FOR MEASURING IMPEDANCE AT RADIO FREQUENCIES
Filed Aug. 29, 1947 3 Sheets-Sheet 2
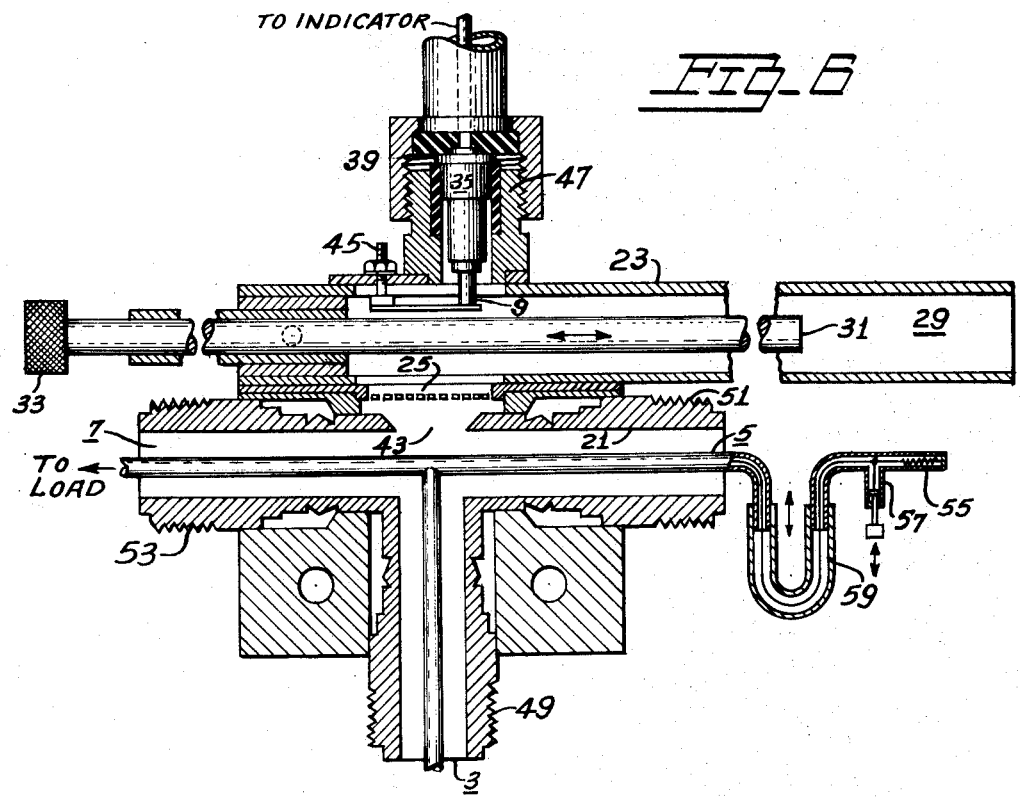
Inventor
*OAKLEY M. WOODWARD, JR.*
Attorney March 3, 1953  O. M. WOODWARD, JR  2,630,475
MEANS FOR MEASURING IMPEDANCE AT RADIO FREQUENCIES
Filed Aug. 29, 1947  3 Sheets-Sheet 3

INVENTOR.
OAKLEY M. WOODWARD, JR.
BY
ATTORNEY

Patented Mar. 3, 1953

2,630,475

UNITED STATES PATENT OFFICE 2,630,475

MEANS FOR MEASURING IMPEDANCE AT RADIO FREQUENCIES

Oakley M. Woodward, Jr., Princeton, N. J., assignor to Radio Corporation of America, a corporation of Delaware Application August 29, 1947, Serial No. 771,241

9 Claims. (Cl. 175—183)

This invention relates generally to transmission line measuring apparatus and more particularly to improved reflectometers for indicating load matching, load impedance, wave reflection coefficient, and power delivered to a load through a coaxial or open-wire transmission line.

Customary procedure in matching coaxial transmission lines to a load, in measuring load impedance or in determining the power transmitted to said load has been to employ a slotted section of coaxial line and a sliding-probe indicator. Although this method is quite satisfactory, it is essential that the operator have some knowledge of transmission line theory and practice in order that such measurements may be readily made. In the case of a load having several adjustable elements, the measurement and matching process may be quite complicated. Since the slotted line and movable probe apparatus are primarily laboratory equipment, they are not well suited for field measurements. The instant invention comprises a simple T junction of coaxial line having one or more coupling loops selectively inductively coupled to and capacitively shielded from the conductors of the line T junction.

A first embodiment of the invention permits the measurement of the degree of load impedance mismatch to the transmission line. A second embodiment of the invention permits measurements of load matching, load impedance, load current, reflection coefficient and standing wave ratio characteristics of the system. A third embodiment of the invention permits additional measurements of load power. The instant invention comprises improvements in the systems and methods disclosed and claimed in my copending U. S. application Serial No. 590,271 filed April 25, 1945, and assigned to the same assignee as the instant application.

Fundamentally, the several embodiments of the instant invention comprise current comparison systems in which the current in the load line and in an adjustable impedance line is compared to the current in the generator line which is connected through the T junction to both the load line and the adjustable impedance line. One or more current pickup loops are symmetrically placed with respect to the T junction to couple selectively magnetically to three coaxial lines which are connected respectively to the generator, the adjustable impedance line, and the load line. The adjustable impedance line includes an adjustable series line section, a shunt adjustable reactor and a known resistor having a value preferably equivalent to the line surge impedance. The coupling loop or loops may be fixed or rotatable and are coupled to the T junction in different manners depending upon the type of measurement to be made, as will be described in greater detail hereinafter. The structure may be readily modified for measurements on an open-wire line, and if desired, the adjustable line section and reactor may be coaxial line elements for high radio frequency applications or lumped circuit elements for lower frequency applications.

In accordance with the invention, adjustment of the variable shunt reactor provides means for establishing any desired standing wave ratio in the branch adjustable impedance line. Adjustment of the variable series line section provides means for moving standing wave maxima and minima along the branch line with respect to the pickup loops at the line T junction. By suitable adjustments of the two reactive elements in the branch line, a null may be established at the T junction and the reactive and resistive components of the load may be determined by the calibrated values of reactance introduced into the branch line.

Among the objects of the invention are to provide an improved method of and means for measuring the transmission of energy through a transmission line connecting a generator to a load. Another object of the invention is to provide an improved reflectometer for measuring the degree of mismatch of a load connected to a coaxial transmission line. An additional object of the invention is to provide an improved reflectometer for measuring the impedance of a load connected to a coaxial transmission line. A further object of the invention is to provide an improved reflectometer for measuring the current transmitted to a load through a coaxial transmission circuit. A still further object of the invention is to provide an improved device for measuring the reflection coefficient or the standing wave ratio in a coaxial transmission line connecting a high frequency generator to a load. Another object is to provide an improved device for measuring the power transmitted through a coaxial transmission line connecting a generator to a load. An additional object is to provide an improved reflectometer comprising a T junction of three coaxial transmission lines, and at least one coupling loop inductively coupled to said T junction for measuring the energy characteristics in a transmission line connecting a generator to an unknown load and to an adjustable impedance branch load circuit having known characteristics.

The invention will be described in greater detail by reference to the accompanying drawings of which Figure 1 is a schematic circuit diagram of a first embodiment of the invention, Figure 2 is a schematic diagram explanatory of second and third embodiments of the invention, Figure 3 is a schematic circuit diagram of the detector and the indicator portions of the embodiment of the invention adapted to provide power measurements, Figure 4 is a fragmentary cross-sectional view of a first embodiment of the invention for measuring the degree of load matching, Figure 5 is a plan view of the electrostatic shield comprising an element of the device shown in Figure 4, Figure 6 is a cross-sectional view of a modification of said first embodiment of the invention, and Figure 7 is a family of graphs on a Smith impedance chart illustrative of the impedance component relations involved in measurements according to the invention. Similar reference characters are applied to similar elements throughout the drawings.

The invention will be described by comparison to the system disclosed in said copending application wherein the branch line is terminated by a matched resistor. Therefore, referring to Figure 1, a high frequency generator 1 is connected through a generator coaxial line 3 to a T junction with two other coaxial lines 5, 7, which are connected, respectively, to a matched resistor $Z_c$ and to a load. A coupling loop 9 comprising a single turn is symmetrically coupled to the branch coaxial lines 5 and 7 at the T junction of the three lines 3, 5 and 7. The coupling loop and the centers of the conductors forming the T junction are in a common plane. Zero current will flow in the pickup loop 9 when the load current $I_L$ and the matched line current $I_m$ are equal and in phase. This condition obtains only when the load impedance equals the matched line impedance $Z_c$ since the two branch lines 5 and 7 are fed by a common voltage E at the T junction. The matching resistor $Z_c$ is assumed to match exactly the surge impedance of the coaxial line 5. For any other load impedance, a resultant current will be induced in the pickup loop 9. This current may be rectified and indicated by means of a detector and a D.-C. meter, not shown, to indicate the degree of mismatch of the load impedance to the surge impedance of the load transmission line 7.

Assuming a mismatched load, a standing wave will be produced as shown in Figure 1.

The impedance of the load line at the junction is $$\bar{Z}_B = \frac{\bar{E}}{\bar{I}_L} \quad (1)$$

and the impedance of the matched line is $$Z_c = \frac{\bar{E}}{\bar{I}_m} \quad (2)$$

Hence $$\bar{I}_L = \bar{I}_m \times \frac{Z_c}{\bar{Z}_B} \quad (3)$$

Obtaining the impedance of $Z_B$ in terms of $Z_A$ and $\rho$, where $\rho$ is the length in electrical degrees from a voltage minimum of the load line 7 to the T junction; and $Z_A$ is the impedance at a point on the line where a voltage minimum occurs:

$$\bar{Z}_B = \frac{Z_A + jZ_c \tan \rho}{Z_c + j\bar{Z}_A \tan \rho} \times Z_c$$

or $$\frac{\bar{Z}_B}{Z_c} = \frac{\left(\frac{\bar{Z}_A}{Z_c}\right) + j \tan \rho}{1 + j\left(\frac{\bar{Z}_A}{Z_c}\right) \tan \rho} \quad (4)$$

But $Z_A = Z_c \times \mathcal{R} \quad (5)$ where $\mathcal{R}$ is the standing wave ratio on the load line. Therefore $$\frac{\bar{Z}_B}{Z_c} = \frac{\mathcal{R} + j \tan \rho}{1 + j\mathcal{R} \tan \rho} \quad (6)$$

Substituting in Equation 3:

$$\bar{I}_L = \bar{I}_m \frac{(1 + j\mathcal{R} \tan \rho)}{(\mathcal{R} + j \tan \rho)} \quad (7)$$

The current ($I_0$) induced in the pickup loop is proportional to the difference of the two currents $I_L$ and $I_m$.

$$\bar{I}_0 = K(\bar{I}_L - \bar{I}_m)K = \bar{I}_m \left[\frac{(1 + j\mathcal{R} \tan \rho)}{(\mathcal{R} + j \tan \rho)}\right] \quad (8)$$

where K is a proportionality constant depending upon the loop area, spacing, frequency, etc.

$$I_0 = (KI_m)\frac{(1 + j\mathcal{R} \tan \rho - \mathcal{R} - j \tan \rho)}{(\mathcal{R} + j \tan \rho)} = \left(\frac{KE}{Z_c}\right)\frac{(1 - \mathcal{R})(1 - j \tan \rho)}{(\mathcal{R} + j \tan \rho)} \quad (9)$$

The absolute value of the pickup loop current is $$|I_0| = \left(\frac{KE}{Z_c}\right)(1 - \mathcal{R})\sqrt{\frac{(1 + \tan^2 \rho)}{(\mathcal{R}^2 + \tan^2 \rho)}} \quad (10)$$

Assuming a constant standing wave ratio, the pickup loop current will vary as a function of the relative position of the standing wave with respect to the T junction. For this condition the current $I_0$ will vary from a maximum of $$\frac{(1 - \mathcal{R})}{\mathcal{R}} \text{ for } \rho = 0°$$

to a minimum of $(1 - \mathcal{R})$ for $\rho = 90°$ $$\frac{I_{min.}}{I_{max.}} = \frac{(1 - \mathcal{R})}{\left(\frac{1 - \mathcal{R}}{\mathcal{R}}\right)} = \mathcal{R} \quad (11)$$

Hence the ratio of the minimum current to the maximum current for a constant standing wave ratio and a variable standing wave shift is seen to be equal to the standing-wave-ratio.

For simplicity, a fixed crystal detector, not shown, may be employed as the rectifier in the pickup loop circuit. Therefore, the meter deflection will be proportional to the square of the pickup loop current. Since a constant input voltage E is assumed, it is seen that, as the load impedance approaches a match with the surge impedance of the transmission line, the rate of change of the indicating meter deflection rapidly diminishes. In actual practice, the load line 7 may be matched with adjustable elements such as inductive stubs, each stub being adjusted in turn for minimum meter deflection until the meter provides null or substantially zero indication. Although the exact standing wave ratio of a mismatched load cannot be obtained directly with this embodiment of the invention, an experienced operator may estimate quite accurately standing wave ratios in the higher range for fixed generator power output.

A second embodiment of the invention is illustrated schematically in Figure 2, wherein the T junction formed by the three coaxial lines 3, 5 and 7 is coupled to a rotatable coupling loop disposed in a plane S—S normal to the common plane through the three coaxial lines forming the T junction. The plane of the coupling loop may be rotated through an angle of 90° to the position D—D. If desired, as explained in greater detail hereinafter, two separate coupling loops may be employed, one being disposed in the plane S—S and the other being disposed in the plane D—D. The two coupling loops would be both magnetically and electrostatically shielded from each other. Lines through the centers of the coupling loops would coincide with the center of the T junction.

Considering first the embodiment of the invention employing a single rotatable coupling loop, in the position S—S the loop is coupled substantially only inductively to the generator coaxial line 3. The coupling is substantially purely inductive since the loop is electrostatically shielded from the coaxial line by slots in the outer conductor of the lines. When the loop is in the plane D—D, it is inductively coupled substantially only to the matched line 5 and the load line 7. When the coupling loop is in the plane D—D, a current $I_D$ is induced in the loop which is proportional to the vector difference of the load current $I_B$ and the matched line current $I_m$. When the loop is in the plane S—S, a current $I_S$ is induced in the loop which is proportional to the vector sum of the load current $I_B$ and the matched line current $I_m$.

$$\bar{I}_m = \frac{\bar{E}}{Z_c} \qquad (12)$$

$$\bar{I}_B = \frac{\bar{E}}{Z_B} = \frac{\bar{E}}{\mathcal{R}_B + jX_B} \qquad (13)$$

where $R_B$ and $X_B$ are the resistive and reactive components of the load impedance $Z_B$.

$$\bar{I}_m + \bar{I}_B = \frac{\bar{E}}{Z_c} + \frac{\bar{E}}{\mathcal{R}_B + jX_B} = \bar{E}\left(\frac{Z_c + \mathcal{R}_B + jX_B}{Z_c(\mathcal{R}_B + jX_B)}\right) =$$
$$\left(\frac{\bar{E}}{\mathcal{R}_B + jX_B}\right)\left(1 + \frac{\mathcal{R}_B + jX_B}{Z_c}\right) \qquad (14)$$

$$\bar{I}_m - \bar{I}_B = \frac{\bar{E}}{Z_c} - \frac{\bar{E}}{\mathcal{R}_B + jX_B} = \bar{E}\left(\frac{\mathcal{R}_B + jX_B - Z_c}{Z_c(\mathcal{R}_B + jX_B)}\right) =$$
$$\left(-\frac{\bar{E}}{\mathcal{R}_B + jX_B}\right)\left(1 - \frac{\mathcal{R}_B + jX_B}{Z_c}\right) \qquad (15)$$

The ratio of the absolute magnitudes of the loop currents in the planes D—D and S—S is $$\frac{\bar{I}_D}{\bar{I}_S} = \frac{1 - \frac{\mathcal{R}_B + jX_B}{Z_c}}{1 + \frac{\mathcal{R}_B + jX_B}{Z_c}} \qquad (16)$$

The general transmission line equation is $$i = \frac{\bar{I}_0}{2}\left(1 - \frac{Z_B}{Z_c}\right)\epsilon^{(\alpha + j\beta)x} + \frac{\bar{I}_0}{2}\left(1 + \frac{Z_B}{Z_c}\right)\epsilon^{-(\alpha + j\beta)x} \qquad (17)$$

wherein the first term is representative of the reflected wave, and the second term is representative of the incident wave in the load line 7.

Therefore, it is seen that the ratio of the absolute magnitudes of the currents in the loop when it is oriented in the planes D—D and S—S, provides the ratio of the magnitudes of the reflected wave and of the incident wave, which by definition is the reflection coefficient K. Hence, in operation of the device, if the coupling loop 9 is connected to a linear detector, and the linear detector is connected to a suitable D.-C. indicator, the ratio of the rectified loop currents provides the reflection coefficient K. The indicating meter may be calibrated in terms of the standing wave ratio $\mathcal{R}$ on the load line 7, since $\mathcal{R}$ equals $$\frac{(1-K)}{(1+K)}$$

The gain of the detector or the power output of the generator may be adjusted to provide full scale reflection of the indicator when the loop is in the plane S—S. Then by rotating the loop to the plane D—D, the standing wave ratio $\mathcal{R}$ may be read directly on the meter scale.

The alternative arrangement wherein two loops are employed, one in the plane S—S and the other in the plane D—D, may utilize a single detector and indicator which may be switched to either loop, or separate detectors and indicators may be used. Since the two loops must be magnetically and electrostatically shielded from each other, the most convenient arrangement is to locate them on opposite sides of the T junction and to shield them by means of a magnetic shield disposed in the plane of the T junction.

Although the reflectometer is substantially independent of frequency (assuming that the matched resistor is matched at all operating frequencies), the physical size of the coupling loop or loops may be taken into consideration. If the loop is wide enough or the frequency sufficiently high, the loop current will be an integration of the varying line currents produced by mismatch of the load, and will not indicate the load currents flowing only at the T junction.

It is noted that when the loop is in the plane D—D, the device operates in essentially the same manner as that described heretofore with respect to the arrangement of Figure 1. However, by providing the rotatable coupling loop, or by utilizing two coupling loops disposed at right angles, the device provides the additional indications of load power, load matching, reflection coefficient, and standing-wave-ratio.

For measurement of load power (see Figure 3), the loop in the plane S—S is connected to a first square-law detector 11, and the loop in the plane D—D is connected to a second square-law detector 13. The rectified output currents $I'_S$ and $I'_D$ from the two square-law detectors are connected in series opposition to a common D.-C. current indicator 15 whereby $$I'_S = [N(\bar{I}_B + \bar{I}_m)]^2 = N^2 I_B^2\left(\frac{1}{Z_c} + \frac{2\mathcal{R}_B}{Z_c} + \frac{\mathcal{R}_B^2}{Z_c^2} + \frac{X_B^2}{Z_c^2}\right) \qquad (18)$$

$$I'_D = [N(\bar{I}_B - \bar{I}_m)]^2 = N^2 I_B^2\left(\frac{1}{Z_c} - \frac{2\mathcal{R}_B}{Z_c} + \frac{\mathcal{R}_B^2}{Z_c^2} + \frac{X_B^2}{Z_c^2}\right) \qquad (19)$$

$$I'_S - I'_D = \left(\frac{4\mathcal{R}_B}{Z_c}\right)(N^2 I_B^2) \qquad (20)$$

$$P_B = I_B^2 \mathcal{R}_B \qquad (21)$$

$$\therefore I'_S - I'_D = \frac{4N^2}{Z_c} P_B \qquad (22)$$

wherein N is a proportionality constant.

The power indicating meter 15 may be calibrated by applying known values of power to the load.

Again referring to Figure 2, the absolute magnitude and the phase angle of the load impedance may be determined by deriving the loop currents in two additional planes A—A and C—C which are disposed at 45° angles with respect to the conductors forming the T junction. The current Ic in the coupling loop when it is disposed in the plane C—C is $$\overline{I}_C = \frac{\overline{I}_m}{\sqrt{2}} + \frac{\overline{I}_m}{\sqrt{2}} = \sqrt{2}\,\overline{I}_m \tag{23}$$

since components of the load current $I_B$ flow in opposite directions when the loop is in the plane C—C.

$$\overline{I}_A = \frac{\overline{I}_B}{\sqrt{2}} + \frac{\overline{I}_B}{\sqrt{2}} = \sqrt{2}\,\overline{I}_B \tag{24}$$

since components of the matched line current $I_m$ flow in opposite directions when the coupling loop is in the plane A—A $$\overline{I}_m = \frac{\overline{E}}{Z_c} \tag{25}$$

$$\overline{I}_B = \frac{\overline{E}}{Z_B} \tag{26}$$

$$\frac{\overline{I}_m}{\overline{I}_B} = \frac{Z_B}{Z_c} = \frac{\overline{I}_C}{\overline{I}_A} \tag{27}$$

Hence the ratio of the loop currents in the two planes C—C and A—A provides the absolute magnitude of the load impedance in terms of the line characteristic impedance. Since $$I_S = [I_m + I_B \cos\phi + j\, I_B \sin\phi] \tag{28}$$

$$I_D = [I_m + I_B \cos\phi - j\, I_B \sin\phi] \tag{29}$$

where $\phi$ is the phase angle of the load impedance $$I_S^2 = I_m^2 + 2\, I_m I_B \cos\phi + I_B^2 \tag{30}$$

$$I_D^2 = I_m^2 - 2\, I_m I_B \cos\phi + I_B^2 \tag{31}$$

$$I_S^2 - I_D^2 = 4\, I_m I_B \cos\phi \tag{32}$$

$$I_m I_B = \frac{I_A I_C}{2} \tag{33}$$

$$\therefore \cos\phi = \frac{I_S^2 - I_D^2}{2 I_A I_C} \tag{34}$$

$$\phi = \cos^{-1} \frac{I_S^2 - I_D^2}{2 I_A I_C} \tag{35}$$

It should be noted that the sign of the phase angle is not obtained by these measurements.

In accordance with the instant invention, the foregoing embodiments and modifications thereof may be further modified by including an adjustable shunt capacitance device connected across the matched resistor to provide means for establishing any desired standing-wave-ratio on the branch line 5. Also, an adjustable series line section such as a trombone device is serially connected in the branch line 5 to shift the positions of the standing wave maxima and minima with respect to the pickup loop at the T junction. By suitable calibration of the adjustable reactance and line devices, the resistive and reactance components of the load may be determined directly or by reference to transmission line charts when a null occurs at the loop at the T junction due to an impedance balance between the load and branch circuits.

Figure 4 shows one embodiment of the invention which provides means for indicating the degree of mismatch of the load impedance, the value of the load impedance and the standing-wave-ratio on the load line. The coaxial lines 3, 5 and 7 are provided with conventional connectors, not shown, for connection to the generator line, the matching resistor and the load, respectively. An aperture is provided in the outer conductor 21 of the lines 5 and 7 adjacent to the T connection with the generator line 3. A short conductive tube 23, set into the T junction at said aperture, includes a screen 25 for providing electrostatic shielding for, but inductive coupling to, the inner conductors of the transmission lines at the T junction. A small closed coupling loop 27, enclosed within the tubular member 23, provides inductive coupling from the load and matched lines, symmetrically with respect to the T junction, to a quarter-wave resonant line 29 which is tunable by means of a telescopic inner conductor 31, the longitudinal penetration of which is controlled by means of a control knob 33.

The quarter-wave resonant line 29 is coupled to the coupling loop 27 adjacent the short-circuited end of said line, thus providing high sensitivity and selectivity. The pickup loop 9 is coupled into the resonant line 29 at another point near the shorted end of the line. A crystal detector, or other high frequency detecting device 35, is connected in series with the pickup loop 9 and a D.-C. indicating device 37. A bypass capacitor 39, connected across the indicator circuit adjacent the detector 35, bypasses the alternating components derived from the detector. If desired, amplification may be provided in the line connecting the detector and bypass capacitor to the indicator 37.

In operation, the cavity resonator 29 is adjusted until maximum sensitivity is provided at the operating frequency. The matching resistor connected to the matched line 5 may comprise a non-inductive resistor equal to the surge impedance of the generator line, and mounted within a conventional connector plug inserted into the matched line connector. In operation the adjusting elements of the load and the load line are adjusted separately to provide minimum indications on the indicator 37. When all load and load line tuning elements are properly adjusted, a null reading should be provided on the indicator. The adjustable series inductive and shunt capacitive reactors as well as the matched resistor described hereinafter by reference to Figure 6 are connected to the branch line 5 in accordance with the invention.

Figure 5 illustrates the construction of the electrostatic shield 25 which is interposed between the coupling loop 27 and the T junction. The shield may comprise a circular bezel 41 supporting only one end of the group of parallel disposed wires 43 which extend to within a short distance of each other at a line through the center of the bezel.

The structure of Figure 6 is similar to that of Figure 4 with the exception that the coupling loop 27, and the tubular member 23 surrounding it, have been omitted. The bezel 25 is inserted directly adjacent the aperture 43 in the outer conductor wall 21 adjacent the T junction. The pickup loop 9 comprises a short, flat metallic strip supported by a grounded terminal 45 and contacting the end terminal of the tubular crystal detector 35. The crystal detector 35 is enclosed within a connector plug element 47 which includes structure forming the bypass capacitor 39. The connector 47 provides means for connecting the detector through a coaxial line to the indicator at a remote point. Conventional connectors 49, 51 and 53 are provided in the three coaxial lines 3, 5 and 7, respectively, at short distances from the T junction for connections to the generator, matched resistor and load, respectively.

The branch line 5 is terminated by a resistor 55 of a value selected to match the surge impedance of the transmission line. The resistor 55 is shunted by a reactive coaxial line stub 57, which is adjustable in length to provide the desired sign and magnitude of reactance. Adjustment of the reactive stub 57 thereby varies the standing wave ratio on the branch line 5 to any desired value. In order to shift the maxima and minima of the standing waves on the branch line 5 with respect to the T junction of the coaxial lines, an adjustable trombone or line section 59 is serially interposed between the T junction and the capacitive tuning stub 57. Adjustment of the trombone section 59 thereby effectively inserts different line lengths in the branch line 5 thereby shifting the positions of the maxima and minima with respect to the T junction. If desired, lumped circuit elements may be substituted for the coaxial line reactive elements when the system is employed for the measurement of relatively low radio frequency which would involve cumbersome coaxial line reactive elements.

In operation, the reactive coaxial line stub and trombone elements are adjusted to provide a null reading on the indicator in order that the resistive and reactive components of the load may be matched to the resistive and reactive components in the branch line. The trombone and reactive stub elements in the branch line should be calibrated with respect to a family of graphs or a suitable chart for the desired operating frequency or frequency range in order that the standing wave ratio, reflection coefficient, and standing wave minima shift on the line may be readily determined. By employing the customary Smith transmission line impedance charts, the load impedance may be determined, and transformed through the effective line length to obtain the value of the load impedance itself.

Referring to Figure 7 which is illustrative of a typical Smith impedance chart, the impedance loci of the adjustable reactance 57 in shunt with the matched resistor 55 lies on a semi-circle 61. The length of the short-circuited adjustable reactance 57 is indicated on the loci 61 in terms of fractions of a wavelength $\lambda$ at the operating frequency. For a given reactance length, the resultant impedance $Z_1$ is transformed on the chart toward the generator an angular distance corresponding to the length of the trombone 59 in fractions of a wavelength to obtain the impedance $Z_2$ which is identical to the load impedance. It is understood that the characteristic impedances of the trombone and the adjustable reactance are equal to the characteristic impedance $Z_c$ of the transmission line.

As an example, assuming that the adjustable reactance and adjustable trombone lengths are .075 $\lambda$ and .147 $\lambda$ respectively to produce a null indication on the indicator at the line junction, the .075 $\lambda$ on the loci 61 establishes a radius 63 which is continued, from the value .063 on the outer scale, around the chart on the arc 65 a distance .147 $\lambda$ which is the effective line length between the adjustable reactance 57 and the junction of the transmission lines. The rotated radius 63' thus intersects the arc 65 at the point 67 corresponding to the value .210 on the outer scale of the chart. This point 67 corresponds to the impedance $Z_2$ reflected to the line junction and under null conditions corresponds to the load impedance reflected to the line junction. Reference to the chart indicates that the load resistance component has a value of 2 $Z_c$ and the load reactance component is positive and has a value of 2.6 $Z_c$. Therefore the load impedance $Z_2$ is determined to be $(2.0+j2.6)$ $Z_c$ ohms.

Various other types of charts may be employed in solving for the load impedance in terms of the resistance, reactance and line length values in the measuring arm of the system in accordance with known engineering technique.

I claim as my invention:

1. A circuit for determining the impedance of a load coupled to a transmission line including a junction in said line, an impedance device connected to said junction of said line, means for adjusting said device to generate standing waves from said device at said junction equal in magnitude to standing waves from said load on said line at said junction, phase shifting means comprising an adjustable length section of line for shifting the position along said line of said standing waves from said device to oppose said standing waves from said load, means inductively coupled to said line at said junction, energy detecting means responsive to currents induced in said coupling means for indicating a balanced standing wave condition on said line, and calibrating means for said impedance device adjusting means and said phase shifting means for determining said load impedance.

2. A device for determining the impedance of a load coupled to a radio frequency transmission line including a plurality of sections of line having a single common junction, means for connecting said transmission line to one of said line sections, means for connecting a load to another one of said line sections, an impedance element connected to the remaining one of said line sections, means for adjusting the impedance magnitude of said element to provide standing waves on said element line section equal in magnitude to standing waves on said load line section, means for shifting said standing waves along said element line section comprising an adjustable length line section to oppose said standing waves on said load line section, means inductively coupled to and capacitively isolated from said junction, energy detecting means responsive to currents induced in said coupling means for indicating a balanced standing wave condition on said load line and impedance element line sections, and calibrating means for said impedance element adjusting means and said wave shifting means for determining said load impedance.

3. A device for determining the impedance of a load coupled to a radio frequency transmission line including a plurality of sections of line having a common junction, means for connecting said transmission line to one of said line sections, means for connecting a load to another one of said line sections, an impedance element connected to the remaining one of said line sections, means for adjusting the impedance of said element to provide standing waves on said element line section equal in magnitude to standing waves on said load line section, means for shifting said standing waves along said element line section comprising an adjustable length line section to oppose said standing waves on said load line section, a coupling loop coupled to said junction, energy detecting means responsive to currents induced in said coupling loop for indicating a balanced standing wave condition on said load line and impedance element line sections, and calibrating means for said impedance element adjusting means and said wave shifting means for determining said load impedance.

4. A device for determining the impedance of a load coupled to a radio frequency transmission line including a plurality of sections of line having a common junction, means for connecting said transmission line to one of said line sections, means for connecting a load to another one of said line sections, an impedance element comprising a resistance substantially equal in magnitude to the surge impedance of said line and an adjustable reactance shunting the remaining one of said line sections, means for adjusting said reactance to provide standing waves on said element line section equal in magnitude to standing waves on said load line section, means for shifting said standing waves along said element line section comprising an adjustable line length portion of said element line section to oppose said standing waves on said load line section, a coupling loop coupled to said junction, energy detecting means responsive to currents induced in said coupling loop for indicating a balanced standing wave condition on said load line and impedance element line sections, and calibrating means for said impedance element adjusting means and said wave shifting means for determining said load impedance.

5. A device for determining the impedance of a load coupled to a radio frequency transmission line including a plurality of sections of line having a common junction, means for connecting said transmission line to one of said line sections, means for connecting a load to another one of said line sections, an impedance element comprising a resistance substantially equal in magnitude to the surge impedance of said line and an adjustable reactance shunting the remaining one of said line sections, means for adjusting said reactance to provide standing waves on said element line section equal in magnitude to standing waves on said load line section, means comprising an adjustable line section serially interposed in said element line section for shifting said standing waves along said element line section to oppose said standing waves on said load line section, a coupling loop coupled to said junction, energy detecting means responsive to currents induced in said coupling loop for indicating a balanced standing wave condition on said load line and impedance element line sections, and calibrating means for said impedance element adjusting means and said wave shifting means for determining said load impedance.

6. A device for determining the impedance of a load coupled to a radio frequency transmission line including a plurality of sections of line having a common junction, means for connecting said transmission line to one of said line sections, an impedance element comprising serially connected resistance, capacitance and inductance shunting the remaining one of said line sections, means for adjusting the reactance of said element to provide standing waves on said element line section equal in magnitude to standing waves on said load line section, means comprising an adjustable length section of line serially interposed in said element line section for shifting said standing waves along said element line section to oppose said standing waves on said load line section, a coupling loop coupled to said junction, energy detecting means responsive to currents induced in said coupling loop for indicating a balanced standing wave condition on said load line and impedance element line sections, and calibrating means for said impedance element adjusting means and said wave shifting means for determining said load impedance.

7. A device for determining the impedance of a load coupled to a coaxial transmission line including a plurality of sections of coaxial line having a common junction, means for connecting said transmission line to one of said line sections, means for connecting a load to another one of said line sections, an impedance element comprising a resistance and an adjustable reactance shunting the remaining one of said line sections, means for adjusting said reactance of said element to provide standing waves on said element line section equal in magnitude to standing waves on said load line section, means comprising an adjustable length coaxial line section serially interposed in said element line section for shifting said standing waves along said element line section to oppose said standing waves on said load line section, a coupling loop coupled to said junction, energy detecting means responsive to currents induced in said coupling loop for indicating a balanced standing wave condition on said load line and impedance element line sections, and calibrating means for said impedance element adjusting means and said wave shifting means for determining said load impedance.

8. A device for determining the impedance of a load coupled to a coaxial transmission line including a plurality of sections of coaxial line having a common junction, means for connecting said transmission line to one of said line sections, means for connecting a load to another one of said line sections, an impedance element comprising a resistor and an adjustable coaxial stub line terminating the remaining one of said line sections, means for adjusting said stub line to provide standing waves on said element line section equal in magnitude to standing waves on said load line section, means comprising an adjustable "trombone" coaxial line section serially interposed in said element line section for shifting said standing waves along said element line section to oppose said standing waves on said load line section, a coupling loop coupled to said junction, energy detecting means responsive to currents induced in said coupling loop for indicating a balanced standing wave condition on said load line and impedance element line sections, and calibrating means for said impedance element adjusting means and said wave shifting means for determining said load impedance.

9. A device for determining the impedance of a load coupled to a radio frequency transmission line including a plurality of sections of line having a single common junction, means for connecting said transmission line to one of said line sections, means for connecting a load to another one of said line sections, an impedance element comprising a resistor and an adjustable stub line terminating the remaining one of said line sections, means for adjusting said stub line to provide standing waves on said element line section equal in magnitude to standing waves on said load line section, phase shifting means to adjust solely the electrical length of said element line section for shifting said standing waves along said element line section to oppose said standing waves on said load line section, a coupling loop coupled to said junction, energy detecting means responsive to currents induced in said coupling loop for indicating a balanced standing wave condition on said load line and impedance element line sections, and calibrating means for said impedance element adjusting means and said wave shifting means for determining said load impedance.

OAKLEY M. WOODWARD, Jr.

REFERENCES CITED

The following references are of record in the file of this patent:

UNITED STATES PATENTS

| Number | Name | Date |
|---|---|---|
| 2,416,790 | Barrow | Mar. 4, 1947 |
| 2,425,084 | Cork et al. | Aug. 5, 1947 |
| 2,437,067 | Bingley | Mar. 2, 1948 |
| 2,456,800 | Taylor et al. | Dec. 21, 1948 |

OTHER REFERENCES

Gaffney, Proceedings of the I. R. E., Waves and Electrons, vol. 34, No. 10, October 1946, pages 775–780.